UNITED STATES PATENT OFFICE.

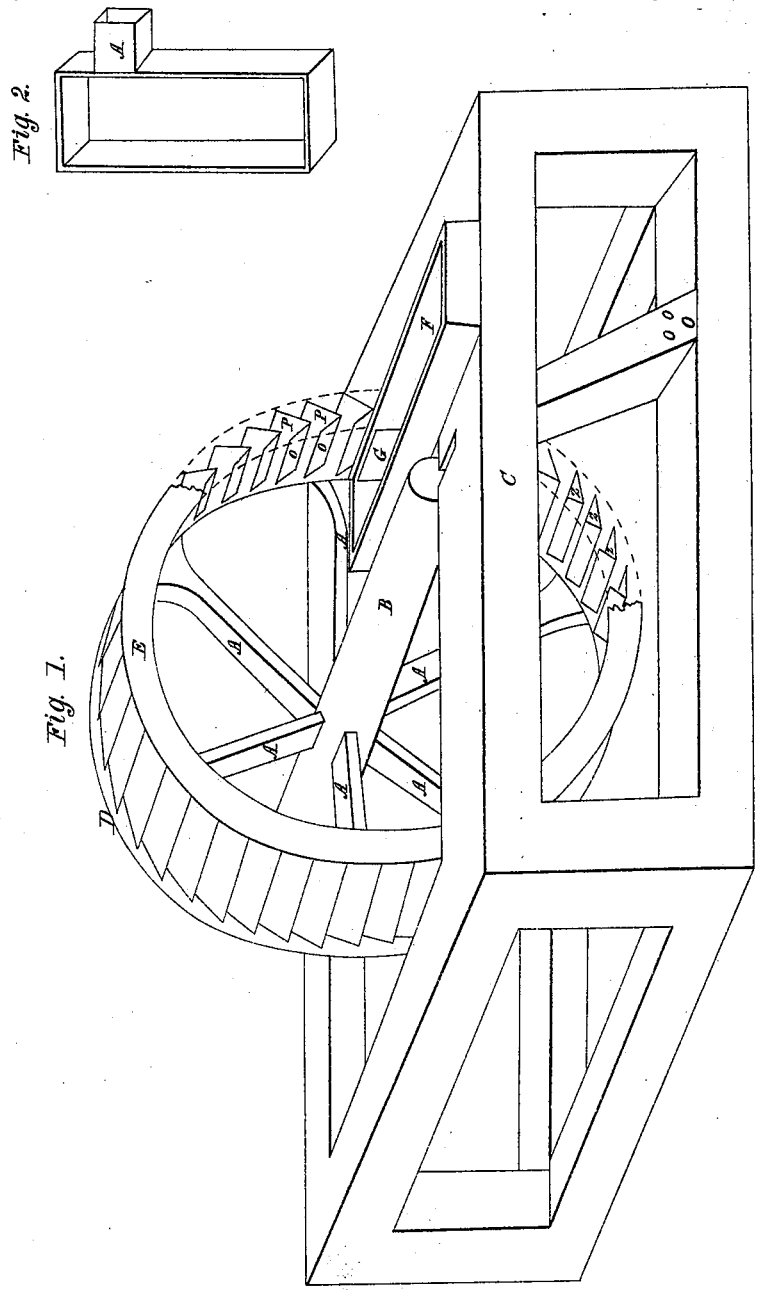

WILLIAM T. BARNES, OF BUFFALO, NEW YORK.

WATER-WHEEL.

Specification of Letters Patent No. 5,678, dated July 25, 1848.

*To all whom it may concern:*

Be it known that I, W. T. BARNES, of the city of Buffalo, county of Erie, State of New York, have invented a new and Improved Water-Wheel, which I shall call "Barnes' Mammouth Water-Wheel;" and I hereby declare that the following is a full, clear, and exact description of the construction and operation of the same, reference being made to the annexed drawings, making part of this specification.

To enable others skilled in the art to make use of my invention I have the model made one half inch to the foot.

Figure 1, A, A, A, A, A, A, of the drawings are the arms of the wheel made of wood or iron (wood answers well). Said arms are mortised, or otherwise attached to the shaft B, which rolls in, or on, and is supported by the frame C. D is the rim which is attached to the arms A, A, A, A, A, A. To said rim D, the buckets are attached and to said buckets is attached the rim E. Bolts can be used which pass through the two rims and arms, and give strength to the wheel. In this manner the buckets and rim E are supported by the rim D which is attached to the arms, which supports the whole wheel. The buckets are set into the two rims D and E. Said buckets can be made of wood or iron, and should be placed far enough apart to allow a free circulation of air through the wheel. The inside leaf of the bucket O, is lower than the outside P. Said part P of said bucket can be made longer from the bottom of said bucket to the outside of said wheel, in order that it may contain, or hold the water the longer, and therefore give more power to the wheel. F is the feeder, or conductor for the water. This is intended to be placed in a line with the center of the wheel upon the inside of said wheel and near the buckets. The water passes through at G, and runs, or drops into the buckets. There can be a small tube attached to the feeder at G, to conduct the water nearer to the buckets.

Fig. 2, A, is the tube attached to the feeder. There can be a gate or cut off for the water at G. The feeder if necessary can be made with a cover.

I will now describe the manner of operation.

The water being introduced into the feeder at F passes through at G into the first bucket, which it immediately fills and overflows upon the inside which is lower than the outside; the second bucket immediately fills and flows over the inside into next below. In this manner it fills five or six or more buckets below the first one filled, which immediately moves the wheel. As the said wheel moves, the water discharges upon the outside of said wheel at Z, Z, Z.

The superiority of this wheel consists in the introduction of water upon the inside, by which there is no waste of water, they readily filling one from the other from the inside and easy discharge upon the outside, as above described, requiring for the power of said wheel, but a small stream of water.

What I claim as my invention and desire to secure by Letters Patent, is—

The application of water, to vertical water wheels operated by the weight of the water from the inside of said wheels and nearly on a level with their axis, in combination with curved or angular buckets extending higher on the outer than on the inner side of the rim for the purpose of retaining the water, receiving additions, and discharging it, at the proper time, substantially as described.

W. T. BARNES.

Witnesses:
LELAH BARNARD,
JAMES G. DAWES.